(12) United States Patent
Zhang et al.

(10) Patent No.: US 11,926,770 B2
(45) Date of Patent: *Mar. 12, 2024

(54) WATER-BASED PRESSURE SENSITIVE ADHESIVE COMPOSITIONS AND METHODS OF MAKING SAME

(71) Applicants: Rohm and Haas Company, Collegeville, PA (US); Dow Global Technologies LLC, Midland, MI (US)

(72) Inventors: Jiguang Zhang, Shanghai (CN); Miao Yang, Shanghai (CN); Shaoguang Feng, Shanghai (CN); Zhaohui Qu, Shanghai (CN)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 411 days.

This patent is subject to a terminal disclaimer.

(21) Appl. No.: 16/325,085

(22) PCT Filed: Aug. 12, 2016

(86) PCT No.: PCT/CN2016/094823
§ 371 (c)(1),
(2) Date: Feb. 12, 2019

(87) PCT Pub. No.: WO2018/027888
PCT Pub. Date: Feb. 15, 2018

(65) Prior Publication Data
US 2021/0284874 A1   Sep. 16, 2021

(51) Int. Cl.
*C09J 7/38*      (2018.01)
*C08F 220/06*    (2006.01)
*C08F 220/14*    (2006.01)
*C08F 220/18*    (2006.01)
*C08F 236/22*    (2006.01)
*C08L 91/00*     (2006.01)

(52) U.S. Cl.
CPC ............ *C09J 7/385* (2018.01); *C08F 220/06* (2013.01); *C08F 220/14* (2013.01); *C08F 220/1802* (2020.02); *C08F 220/1804* (2020.02); *C08F 220/1808* (2020.02); *C08F 236/22* (2013.01); *C08L 91/00* (2013.01); *C09J 2301/302* (2020.08); *C09J 2433/00* (2013.01)

(58) Field of Classification Search
CPC .. C09J 7/385; C09J 2301/302; C09J 2433/00; C09J 133/08; C09J 147/00; C09J 155/00; C08F 220/06; C08F 220/14; C08F 220/1802; C08F 220/1804; C08F 220/1808; C08F 236/22; C08F 2/22; C08F 220/18; C08L 91/00; C08L 2201/54
See application file for complete search history.

(56) References Cited

U.S. PATENT DOCUMENTS

| 3,486,930 A | * | 12/1969 | Antlfinger | ............... D04H 1/64 |
| | | | | 523/206 |
| 3,950,291 A | | 4/1976 | Jurrens | |
| 5,066,694 A | | 11/1991 | Agarwal et al. | |
| 5,484,849 A | * | 1/1996 | Bors | .................. C08F 220/283 |
| | | | | 525/379 |
| 6,727,327 B1 | | 4/2004 | Gerst et al. | |
| 9,023,929 B2 | | 5/2015 | Aarts et al. | |
| 2004/0198903 A1 | | 10/2004 | Madle et al. | |

FOREIGN PATENT DOCUMENTS

| CN | 1329463 C | 8/2007 | |
| CN | 104151485 A | 11/2014 | |
| CN | 104497224 A | 4/2015 | |
| CN | 104513343 A | 4/2015 | |
| EP | 1655356 A1 | 5/2006 | |
| GB | 609750 | * 10/1948 | ............. C08G 63/52 |
| JP | 59149913 A | 8/1984 | |
| JP | 2000044870 A | 2/2000 | |
| JP | 2002194271 A | 7/2002 | |

(Continued)

OTHER PUBLICATIONS

Harwood et al., "Chapter 6: Modification of Oil Crops to Produce Fatty Acids for Industrial Applications" in Ahmad, Moghis U., Fatty Acids—Chemistry, Synthesis, and Applications. AOCS Press (Year: 2017).*

Stephane Roberge et al., Emulsion-based pressure sensitive adhesives from conjugated linoleic acid/styrene/butyl acrylate terpolymers, International Journal of Adhesion & Adhesives, May 9, 2016, vol. 70, pp. 17-25.

(Continued)

*Primary Examiner* — Jessica M Roswell
(74) *Attorney, Agent, or Firm* — Boyle Fredrickson S.C.

(57) ABSTRACT

Disclosed is a composition comprising at least one interpolymer dispersed within an aqueous medium, the interpolymer comprising at least one unsaturated monomer and at least one selected from the group consisting of at least one conjugated acid, at least one mono-ester of a conjugated acid, and mixtures thereof, and, optionally, at least one surfactant configured to stabilize the interpolymer within the aqueous medium. The conjugated acid may be derived from a naturally-occurring oil, such as tung oil. There is also provided a method for preparing a composition, comprising forming an interpolymer comprising the at least one unsaturated monomer and the at least one selected from the group consisting of at least one conjugated acid, at least one mono-ester of a conjugated acid, and mixtures thereof. There is still further provided a pressure sensitive adhesive comprising the composition prepared according to the disclosed method.

4 Claims, No Drawings

(56) References Cited

FOREIGN PATENT DOCUMENTS

| | | |
|---|---|---|
| SU | 651712 A3 | 3/1979 |
| WO | 2005077996 A1 | 8/2005 |
| WO | 2010132406 A1 | 11/2010 |
| WO | 2012024301 A1 | 2/2012 |
| WO | 2018027890 A1 | 2/2018 |

OTHER PUBLICATIONS

Stephane Roberge et al., Bulk Terpolymerization of Conjugated Linoleic Acid with Styrene and Butyl Acrylate, ACS Sustainable Chemistry & Engineering, Dec. 7, 2015, vol. 4, No. 1, pp. 264-272.
PCT/CN2016/094823, International Search Report and Written Opinion dated Apr. 20, 2017.
PCT/CN2016/094823, International Preliminary Report on Patentability dated Feb. 12, 2019.

\* cited by examiner

WATER-BASED PRESSURE SENSITIVE ADHESIVE COMPOSITIONS AND METHODS OF MAKING SAME

FIELD OF THE DISCLOSURE

The instant disclosure relates to pressure sensitive adhesive compositions. More particularly, the disclosure relates to water-based pressure sensitive adhesive compositions with improved adhesion and cohesion and methods of making the same.

BACKGROUND AND SUMMARY OF THE DISCLOSURE

Adhesive compositions are useful for a wide variety of purposes. One particularly useful subset of adhesive compositions is water-based pressure sensitive adhesives. The use of water-based pressure sensitive adhesives in different end-use applications is generally known. For instance, water-based pressure sensitive adhesives can be used with labels, notepads, tapes, decals, bandages, decorative and protective sheets, and a wide variety of other products. As used in the art, the term "pressure sensitive adhesive" designates a material comprising one or more polymer compositions which, when dried, is aggressively and permanently tacky at room temperature. Further, the term "water-based" indicates that the pressure sensitive adhesive is manufactured with an aqueous carrier. A typical water-based pressure sensitive adhesive will firmly adhere to a variety of dissimilar surfaces upon mere contact without the need of more than finger or hand-applied pressure.

Two properties recognized by the pressure sensitive adhesives industry are the adhesion (i.e., initial tack to a surface) and the cohesion (i.e., resistance to shear) of these polymer compositions. Attempts to improve the adhesive properties of pressure sensitive adhesives, such as by the addition of a tackifier to reduce the glass transition temperature of the polymer composition, tend to reduce the resistance to shear, thereby promoting shear failure. The adhesive properties of water-based pressure sensitive adhesives are particularly important when the adhesive is to be used on a low energy surface, such as a polyolefin film.

Therefore, water-based pressure sensitive adhesive compositions with improved adhesion and cohesion, and methods of making same, are desirable.

A composition is disclosed comprising at least one interpolymer dispersed within an aqueous medium, the interpolymer comprising at least one unsaturated monomer and at least one compound selected from the group consisting of at least one conjugated acid, at least one mono-ester of a conjugated acid, and mixtures thereof. The composition can further comprise at least one surfactant.

The conjugated acid may comprise an aliphatic acid. Further, the conjugated acid may comprise an aliphatic carboxylic acid, such as an aliphatic carboxylic acid comprising at least three conjugated double bonds. Still further, the conjugated acid may be derived from a naturally-occurring oil, such as tong oil. Even further, the composition may further include optionally one or more thickeners, optionally one or more defoamers, optionally one or more wetting agents, optionally one or more mechanical stabilizers, optionally one or more pigments, optionally one or more fillers, optionally one or more freeze-thaw agents, optionally one or more neutralizing agents, optionally one or more plasticizers, optionally one or more tackifiers, optionally one or more adhesion promoters, and combinations thereof.

Methods for preparing a composition are also disclosed. In one embodiment, the method comprises dispersing at least one unsaturated monomer and, optionally, at least one surfactant in an aqueous medium to form an emulsified mixture. The method further comprises introducing at least one initiator to the emulsified mixture, thereby polymerizing the at least one unsaturated monomer, and introducing at least one compound selected from the group consisting of at least one conjugated acid, at least one mono-ester of a conjugated acid, and mixtures thereof to the emulsified mixture during polymerization of the at least one unsaturated monomer, thereby forming an interpolymer comprising the at least one unsaturated monomer and the at least one conjugated acid, the at least one mono-ester of the conjugated acid, and/or mixtures thereof.

The interpolymer is stabilized in the emulsified mixture by the at least one surfactant. Further, at least one selected from the group consisting of the at least one conjugated acid, the at least one mono-ester of the conjugated acid, and mixtures thereof is introduced to the emulsified mixture after at least 50% of the unsaturated monomer is introduced to the aqueous medium, or after at least 70% of the unsaturated monomer is introduced to the aqueous medium, or after at least 80% of the unsaturated monomer is introduced to the aqueous medium, or after at least 90% of the unsaturated monomer is introduced to the aqueous medium.

A water-based pressure sensitive adhesive comprising the composition prepared according to the method above is also disclosed.

DETAILED DESCRIPTION OF THE DISCLOSURE

The instant disclosure relates to water-based pressure sensitive adhesive compositions with improved adhesion and cohesion, and methods of making same. According to one embodiment of the disclosure, the water-based pressure sensitive adhesive composition comprises an emulsion comprising at least one interpolymer dispersed within an aqueous medium. The interpolymer comprises at least one unsaturated monomer and at least one compound selected from the group consisting of at least one conjugated acid, at least one mono-ester of a conjugated acid, and a mixtures thereof. The interpolymer can be formed via emulsion polymerization.

In some embodiments, at least one unsaturated monomer is dispersed throughout an aqueous medium together with a surfactant, thereby forming an emulsified mixture. The surfactant acts as an emulsifier and enables droplets of the at least one unsaturated monomer, which is hydrophobic, to form throughout the aqueous medium. An initiator is then introduced into the emulsified mixture. The initiator is configured to react with the at least one unsaturated monomer, thereby forming a polymer comprising unsaturated monomer subunits. The initiator reacts with the at least one unsaturated monomer dispersed throughout the aqueous medium until all or substantially all of the at least one unsaturated monomer is polymerized. The end result is a dispersion of polymer particles in the aqueous medium, the polymer particles comprising the at least one unsaturated monomer subunits.

According to the present disclosure, at least one compound selected from the group consisting of at least one conjugated acid, at least one mono-ester of a conjugated acid, and mixtures thereof is introduced to the emulsified mixture after the initiator is introduced to the emulsified mixture, but before all of the at least one unsaturated monomer is fed to the aqueous medium. In some embodiments, the at least one compound selected from the group consisting of the at least one conjugated acid, the at least one mono-ester of a conjugated acid, and mixtures thereof is added after at least 50% of the at least one unsaturated monomer is introduced to the aqueous medium. In some embodiments, the at least one compound is added after at least 70% of the unsaturated monomer is introduced to the aqueous medium. In some embodiments, the at least one compound is added after at least 80% of the unsaturated monomer is introduced to the aqueous medium. In some embodiments, the at least one compound is added after at least 90% of the unsaturated monomer is introduced to the aqueous medium.

Upon addition into the emulsified mixture, the at least one conjugated acid, the at least one mono-ester of a conjugated acid, and/or mixtures thereof functions as a co-monomer and forms an interpolymer together with the at least one unsaturated monomer. The end result is a dispersion throughout the aqueous medium of both the polymer, comprising the at least one unsaturated monomer subunits, and the interpolymer, comprising both the at least one unsaturated monomer subunits and subunits derived from the at least one compound selected from the group consisting of the at least one conjugated acid, the at least one mono-ester of a conjugated acid, and/or mixtures thereof.

As will be discussed in further detail below and illustrated by way of examples, formation of the interpolymer comprising both unsaturated monomer subunits and subunits derived from the at least one compound selected from the group consisting of the at least one conjugated acid, the at least one mono-ester of a conjugated acid, and mixtures thereof results in a composition that, when applied in a pressure sensitive adhesive application, provides improved adhesion and cohesion relative to existing pressure sensitive adhesive formulations.

In some embodiments, at least one unsaturated monomer may be introduced into the aqueous medium and polymerized, forming polymers and/or interpolymers. Examples of the at least one unsaturated monomer include, but are not limited to, acrylates such as butyl acrylate, ethylhexyl acrylate, ethyl acrylate, methyl acrylate, octyl acrylate, isooctyl acrylate, decyl acrylate, isodecyl acrylate, lauryl acrylate, cyclohexyl acrylate, methacrylates such as methyl methacrylate, isobutyl methacrylate, octyl methacrylate, isooctyl methacrylate, decyl methacrylate, isodecyl methacrylate, lauryl methacrylate, pentadecyl methacrylate, stearyl methacrylate, $C_{12}$ to $C_{18}$ alkyl methacrylates, cyclohexyl methacrylate, styrene, vinyl ester, and combinations thereof. The at least one unsaturated monomer is present in the final emulsified mixture from 30 to 70 weight percent, based on the total weight of the mixture. All subranges from 30 to 70 are included herein and disclosed herein. For example, the range can be from a lower limit of 30, 35, 40, or 45 weight percent to an upper limit of 63, 65, or 70.

In some embodiments, at least one surfactant may optionally be introduced into the aqueous medium for stabilizing the at least one unsaturated monomer and the at least one interpolymer dispersed throughout the aqueous medium. Examples of the at least one surfactant useful include, but are not limited to, cationic surfactants, anionic surfactants, zwitterionic surfactants, non-ionic surfactants, and combinations thereof. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants, such as ethoxylated alcohol, ethoxylated fatty acid, sorbitan derivative, lanolin derivative, ethoxylated nonyl phenol, or alkoxylated polysiloxane. The at least one surfactant is present in the emulsified mixture from 0.05 to 10 weight percent. All subranges from 0.05 to 10 are included herein and disclosed herein. For example, the range can be from a lower limit of 0.05, 0.07, 0.1, or 0.2 to an upper limit of 0.5, 1, 5 or 10.

In some embodiments, at least one compound selected from the group consisting of at least one conjugated acid, at least one mono-ester of a conjugated acid, and mixtures thereof may be introduced into the aqueous medium and polymerized together with the unsaturated monomer subunits. Examples of the at least one conjugated acid include, but are not limited to, unsaturated fatty acids having at least three conjugated double bond. Suitable unsaturated fatty acids include unsaturated fatty acids derivable from naturally-occurring drying oils, such as tung oil. In particular, tung oil comprises fatty acids including α-eleostearic acid, linoleic acid, palmitic acid, and oleic acid, of which α-eleostearic acid is suitable for the purposes of this disclosure.

α-eleostearic acid has the structure according to (I):

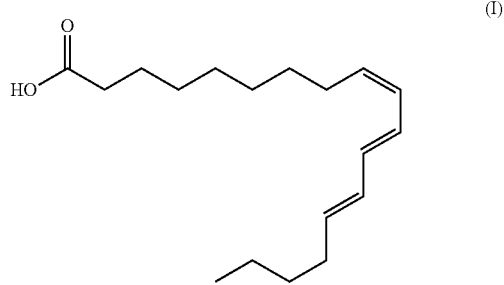 [SMILES: CCCC/C=C/C=C/C=C\CCCCCCCC(=O)O]

Examples of the at least one conjugated acid further include, but are not limited to, aliphatic acids, in particular aliphatic carboxylic acids comprising three or more conjugated double bonds. The at least one conjugated acid is present in the emulsified mixture from 0.01 to 5 weight percent. All individual ratio values and subranges from 0.01 to 5 are included herein and disclosed herein. For example, the ratio can be from a lower limit of 0.01, 0.05, 0.10, or 0.25 to an upper limit of 1, 2, 3, 4, or 5.

In some embodiments, more than one initiator may be introduced into the emulsified mixture for polymerizing the at least one unsaturated monomer. The at least one initiator can be either a thermal initiator or a redox system initiator. One example of the at least one thermal initiator includes, but is not limited to, ammonium persulfate. Where the initiator is a redox system initiator, the reducing agent can be, for example, an ascorbic acid, a sulfoxylate, or an erythorbic acid, while the oxidating agent can be, for example, a peroxide or a persulfate. The at least one initiator is present in the emulsified mixture from 0.05 to 2 weight percent. All subranges from 0.05 to 2 are included herein and disclosed herein. For example, the range can be from a lower limit of 0.05, 0.07, 0.09, or 0.1 to an upper limit of 0.8, 1, 1.3, 1.8, or 2.

As discussed above, the interpolymer comprises at least one unsaturated monomer subunit and subunits derived from the at least one compound selected from the group consisting of the at least one conjugated acid, the at least one mono-ester of a conjugated acid, and mixtures thereof. The pressure sensitive adhesive composition may further include, optionally, one or more additives. Examples of the one or more additives include, but are not limited to, at least one thickener, at least one defoamer, at least one wetting agent, at least one mechanical stabilizer, at least one pigment, at least one filler, at least one freeze-thaw agent, at least one neutralizing agent, at least one plasticizer, at least one tackifier, at least one adhesion promoter, and/or combinations thereof.

The water-based pressure sensitive adhesive composition may comprise 0 to 5 percent by weight of at least one thickener. All individual values and subranges from 0 to 5 weight percent are included herein and disclosed herein. For example, the weight percent of the at least one thickener can be from a lower limit of 0, 0.1 0.2, 0.3, or 0.5 weight percent to an upper limit of 1, 2, 3, 4, or 5 weight percent. Example thickeners include, but are not limited to, ACRYSOL™, UCAR™ and CELOSIZE™ which are commercially available from The Dow Chemical Company, Midland, Mich.

The water-based pressure sensitive adhesive composition may comprise 0 to 2 percent by weight at least one neutralizing agent. All individual values and subranges from 0 to 2 weight percent are included herein and disclosed herein. For example, the weight percent of the at least one neutralizing agent can be from a lower limit of 0, 0.2, 0.3, or 0.5 weight percent to an upper limit of 0.5, 1, 1.5, or 2 weight percent. Neutralizing agents are typically used to control pH to provide stability to the formulated pressure sensitive adhesive composition. Examples of the at least one neutralizing agent include, but are not limited to, aqueous ammonia, aqueous amines, and other aqueous inorganic salts.

The water-based pressure sensitive adhesive composition may comprise less than 50 percent by weight at least one tackifier. All individual values and subranges from less than 50 weight percent are included herein and disclosed herein. For example, the weight percent of the at least one tackifier can be from a lower limit of 0, 0.1, 0.2, 0.3, 0.5, 1, 2, 3, 4, or 5 weight percent to an upper limit of 10, 20, 30, 40, or 50 weight percent. Examples of the at least one tackifier include, but are not limited to, rosin resins including rosin acid and/or rosin ester obtained by esterifying rosin acid with alcohols or an epoxy compound and/or its mixture, non-hydrogenated aliphatic $C_5$ resins, hydrogenated aliphatic $C_5$ resins, aromatic modified $C_5$ resins, terpene resins, hydrogenated $C_9$ resins, and combinations thereof.

The water-based pressure sensitive adhesive composition may comprise less than 5 percent by weight of at least one adhesion promoters. All individual values and subranges from less than 5 weight percent are included herein and disclosed herein. For example, the weight percent of the at least one adhesion promoter can be from a lower limit of 0, 0.1, 0.2, 0.3, 0.5, 1, 2, 3, or 4 weight percent to an upper limit of 0.1, 0.2, 0.3, 0.5, 1, 2, 3, 4, 5 weight percent.

EXAMPLES OF THE DISCLOSURE

The present disclosure will now be explained in further detail by discussing Illustrative Examples and Comparative Examples. However, the scope of the present disclosure is not, of course, limited to these Illustrative Examples.

Emulsion Polymerization Procedure

In general, the emulsion mixture according to the disclosure is prepared as follows. A four liter, five-neck reactor equipped with a condenser, a mechanical stirrer, a temperature-controlled thermal couple and inlets for initiators and monomers, is fed with 675 g of deionized ("DI") water and heated to 88° C. under a gentle $N_2$ flow. In a separate container, a monomer emulsion ("ME") is prepared by mixing 275 g of DI water, 10 g of a sodium dodecylbenzene sulfonates surfactant, such as RHODACAL™ DS-4 from Solvay S.A., Brussels, Belgium ("DS-4"), 11.9 g of a fatty alcohol ethersulfates surfactant, such as DISPONIL™ FES77 surfactant ("FES-77") from BASF SE, Ludwigshafen, Germany, 2.5 g of $Na_2CO_3$, and 1,672 g of a monomer mixture comprising 2-ethylhexyl acrylate ("2-EHA"), butyl acrylate ("BA"), ethyl acrylate ("EA"), methyl methacrylate ("MMA"), and acrylic acid ("AA").

Next, a solution of a mixture of $Na_2CO_3$ and ammonium persfulate ("APS") in 40 g DI water is added into the reactor Immediately after addition of the solution of $Na_2CO_3$ and APS, the monomer emulsion is fed into the reactor. The feeding proceeds for 80 minutes. To achieve the disclosed compositions, a tong oil fatty acid mixture comprising α-eleostearic acid ("T-160" commercial available from Anhui Refined Oil and Fatty Co., Ltd, China) is added into the monomer emulsion after at least 50% of the monomer emulsion had been fed into the aqueous phase. The T-160 is added continuously over time.

Upon completion of the monomer emulsion addition, the reaction mixture is cooled to 60° C. before gradual addition of a solution of tert-butyl hydroperoxide (70%) ("t-BHP") (9.2 g in 32 g DI water) and 6. 8 g of a reducing agent, such as BRUGGOLITE™ FF6 M from Brüggemann Chemical US Company, Chadds Ford, Pa. ("FF6"), in 34.5 g DI water, via two separate pipes over 30 minutes. Upon completion of the feeds, the reaction is cooled to room temperature. The obtained composition is then filtered through 325 mesh filter cloth to prepare the composition for subsequent evaluation work.

Pressure Sensitive Adhesive Formulation

All samples are lightly formulated with a wetting agent, such as 0.5% (wet/wet) AEROSOL™ GPG wetting agent obtained from Cytec, Woodland Park, N.J. ("GPG"), based on total emulsion, to improve wet-out for lab drawdowns unless otherwise specified. The viscosity is then adjusted to about 600 cps (Brookfield, RVDV, 30 rpm, 63 #) using a thickener, such as ACRYSOL™ RM-2020 from The Dow Chemical Company, Midland, Mich. ("RM-2020"), and final pH is adjusted to 7.0 to 7.5 using ammonia.

Lab Drawdowns

Polyethylene ("PE") film is pre-treated by corona treatment before lamination. The formulated adhesive is coated to a release liner in an amount of 18 g/m² on dry weight basis and dried at 80° C. for 6 minutes. The PE film is laminated with the pressure sensitive adhesive coated release liner in such a manner that the adhesive layer is in contact with the corona treated side of PE film to give an adhesive laminate.

Application Tests

Performance testing can be conducted after the adhesive laminate is conditioned in a controlled environment (22-24° C., 50-60% relative humidity) testing laboratory for at least overnight.

Adhesion/Tack Test: Samples are tested on both stainless steel ("SS") and high density polyethylene ("HDPE") test plates according to Féderation Internationale des fabricants et transformateurs d'Adhésifs et Thermocollants ("FINAT") Test Method No. 9.

Cohesion/Shear Test: FINAT Test Method No. 8 is used for the shear resistance test.

Failure mode is recorded behind the value of the tests: "A" indicates adhesion failure and "C" indicates cohesion failure. Illustrative Examples ("IE") and Comparative Examples ("CE") are detailed in Tables 1 and 2 below. Table 1 details the compositions of the IE and CE Examples, with compositions provided in weight percent based on the total weight of the identified raw materials. Table 2 details the tack and shear performance of the tested IE and CE Examples.

TABLE 1

Composition Of IE And CE Examples.

| Raw Material | CE1 | IE1 | IE2 | IE3 | CE2 | CE3 | IE4 |
|---|---|---|---|---|---|---|---|
| 2-ethylhexyl acrylate | 53.8 | 53.8 | 53.8 | 39.5 | 74 | 74 | 74 |
| Butyl acrylate | 19 | 19 | 19 | 32.8 | | | |
| Ethyl acrylate | 22.4 | 22.4 | 22.4 | 22.4 | 16 | 16 | 16 |
| Methyl methacrylate | 3.8 | 3.8 | 3.8 | 3.8 | 9 | 9 | 9 |
| Acrylic acid | 1 | 1 | 1 | 1 | 1 | 1 | 1 |
| T-160 | | 1[a] | 1[b] | 0.5[b] | | | 0.5[b] |
| TOTAL | 100 | 101 | 101 | 100 | 100 | 100 | 100.5 |

[a]Added at 80 percent monomer feeding
[b]Added at 90 percent monomer feeding

TABLE 2

HDPE Tack And Shear Performances Of The Samples.

| | CE 1 | IE 1 | IE 2 | IE 3 | CE 2 | CE 3 | IE 4 |
|---|---|---|---|---|---|---|---|
| Initial Tack[2], HDPE, N/inch2 | 3.6A | 4.9A | 5.1A | 4.5A | 4.4A | 4.9A | 5.3A |
| Shear Resistance, SS, 1" × 1" × 1 kg, DT = 1 min, hrs | 28C | 18C | 16C | 27C | 40C | 30C | 32C |

In Table 2, "A" refers to adhesive failure and "C" refers to cohesive failure.

As discussed above, in the performance of water-based pressure sensitive adhesive applications, the adhesion (i.e., tack) and the cohesion (i.e., resistance to shear) of the pressure sensitive adhesive are two key properties. In existing pressure sensitive adhesive formulations, glass transition temperature (Tg) and molecular weight are commonly used to rebalance tack and shear performance. By improving tack according to these techniques, shear will be dramatically decreased. According to the present disclosure, it is surprisingly found that the use of a conjugated fatty acid, such as T-160 in the Illustrative Examples which comprises α-eleostearic acid, helps to improve tack effectively with less shear force decrease.

Three Comparative Example emulsions are prepared. Comparative Example 1 is based on a composition of 53.82EHA/18.8BA/22.4EA/3.8MMA/1AA, wherein "EHA" represents 2-ethylhexyl acrylate from Sinopharm Chemical Reagent Company, "BA" represents butyl acrylate from Sinopharm Chemical Reagent Company, and "MMA" represents methyl methacrylate from Sinopharm Chemical Reagent Company, "EA" represents ethyl acrylate, and "AA" represents acrylic acid. Comparative Examples 2 and 3 are based on a composition of 74EHA/16EA/9MMA/1AA. Comparative Example 3 includes 10% more APS during formulation than Comparative Example 2 in an effort to rebalance the tack/shear performance. The compositions and their respective performances are summarized in Tables 1 and 2 above.

Four Illustrative Examples according to the present disclosure are produced. Illustrative Examples 1 and 2 are based on the same composition with Comparative Example 1, except 1% T-160 is added into the ME at 80% ME feeding and at 90% ME feeding, respectively. Comparing with Comparative Example 1, tack is significantly improved while shear is sacrificed only slightly.

Illustrative Example 3 is designed to rebalance the tack and shear properties of the composition. Illustrative Example 3 is based on 39EHA/32.8BA/22.4EA/3.8MMA/1AA composition which has a higher Tg than Illustrative Examples 1 and 2. The purpose of the high Tg composition is to improve shear performance, while tack performance may be sacrificed. Comparing with Illustrative Example 2, Illustrative example 3 uses a lower level of T-160 for the purpose of improving shear results. The comparative results show that Illustrative Example 3 has lower tack than Illustrative Examples 1 and 2, but higher shear performance. Comparing with Comparative Example 1, the shear property is similar but tack is improved from 3.6 N/inch to 4.5 N/inch. Thus, a better tack/shear balance is obtained by using T-160 in the composition as discussed above.

Illustrative Example 4 uses 0.5% T-160 in ME at 90% ME feeding. Comparing with Comparative Example 2, Illustrative Example 4 has higher tack but lower shear performance. Comparative Example 3 is designed using a traditional way to decrease molecular weight to improve tack. Comparing with Comparative Example 3, Illustrative Example 4 has similar shear but higher tack.

Illustrative Examples 1 through 4 demonstrate that compositions for use in pressure sensitive adhesive applications prepared according to the present disclosure exhibit increased adhesion and cohesion compared to existing compositions.

The invention claimed is:

1. A water-based adhesive composition, comprising:
   at least one interpolymer dispersed within an aqueous medium, the interpolymer consisting of (i) at least one acrylate selected from the group consisting of butyl acrylate, ethylhexyl acrylate, ethyl acrylate, methyl acrylate, octyl acrylate, isooctyl acrylate, decyl acrylate, isodecyl acrylate, lauryl acrylate and cyclohexyl acrylate methacrylates such as methyl methacrylate, isobutyl methacrylate, octyl methacrylate, isooctyl methacrylate, decyl methacrylate, isodecyl methacrylate, lauryl methacrylate, pentadecyl methacrylate, stearyl methacrylate, $C_{12}$ to $C_{18}$ alkyl methacrylates and cyclohexyl methacrylate, and (ii) optionally acrylic acid, and at least one compound selected from the group consisting of at least one conjugated acid, at least one mono-ester of a conjugated acid, and mixtures thereof;
   wherein the at least one conjugated acid comprises an unsaturated fatty acid having at least three conjugated double bonds,
   wherein the unsaturated fatty acid is an unsaturated fatty acid derivable from tung oil, wherein the at least one conjugated acid is present in the emulsified mixture from 0.01 to 2 weight percent; and
   wherein the tung oil comprises a fatty acid including α-eleostearic acid.

2. The water-based adhesive composition of claim 1, wherein the at least one acrylate is selected from the group consisting of 2-ethylhexyl acrylate, ethyl acrylate, butyl acrylate, methyl (meth)acrylate, (meth)acrylic acid, and mixtures of two or more thereof.

3. A method for preparing a water-based adhesive composition, comprising:
   dispersing at least one unsaturated monomer consisting of (i) at least one acrylate selected from the group consisting of butyl acrylate, ethylhexyl acrylate, ethyl acrylate, methyl acrylate, octyl acrylate, isooctyl acrylate, decyl acrylate, isodecyl acrylate, lauryl acrylate and cyclohexyl acrylate methacrylates such as methyl methacrylate, isobutyl methacrylate, octyl methacrylate, isooctyl methacrylate, decyl methacrylate, isodecyl methacrylate, lauryl methacrylate, pentadecyl methacrylate, stearyl methacrylate, $C_{12}$ to $C_{18}$ alkyl methacrylates and cyclohexyl methacrylate, and (ii) optionally acrylic acid, and at least one surfactant in an aqueous medium to form an emulsified mixture;

introducing at least one initiator to the emulsified mixture, thereby polymerizing the at least one unsaturated monomer; and introducing at least one compound selected from the group consisting of at least one conjugated acid, at least one mono-ester of a conjugated acid, and mixtures thereof to the emulsified mixture during polymerization of the at least one unsaturated monomer, thereby forming an interpolymer comprising the at least one unsaturated monomer and the at least one ester;

wherein the at least one conjugated acid comprises an unsaturated fatty acid having at least three conjugated double bonds, wherein the unsaturated fatty acid is an unsaturated fatty acid derivable from tung oil, wherein the at least one conjugated acid is present in the emulsified mixture from 0.01 to 2 weight percent, wherein the at least one conjugated acid is introduced to the emulsified mixture after at least 90% of the at least one unsaturated monomer is introduced to the aqueous medium; and wherein the tung oil comprises a fatty acid including α-eleostearic acid.

4. A water-based pressure sensitive adhesive comprising the adhesive composition prepared according to claim 3.

* * * * *